March 19, 1957  R. F. MOZLEY  2,786,197
RANGING SYSTEM

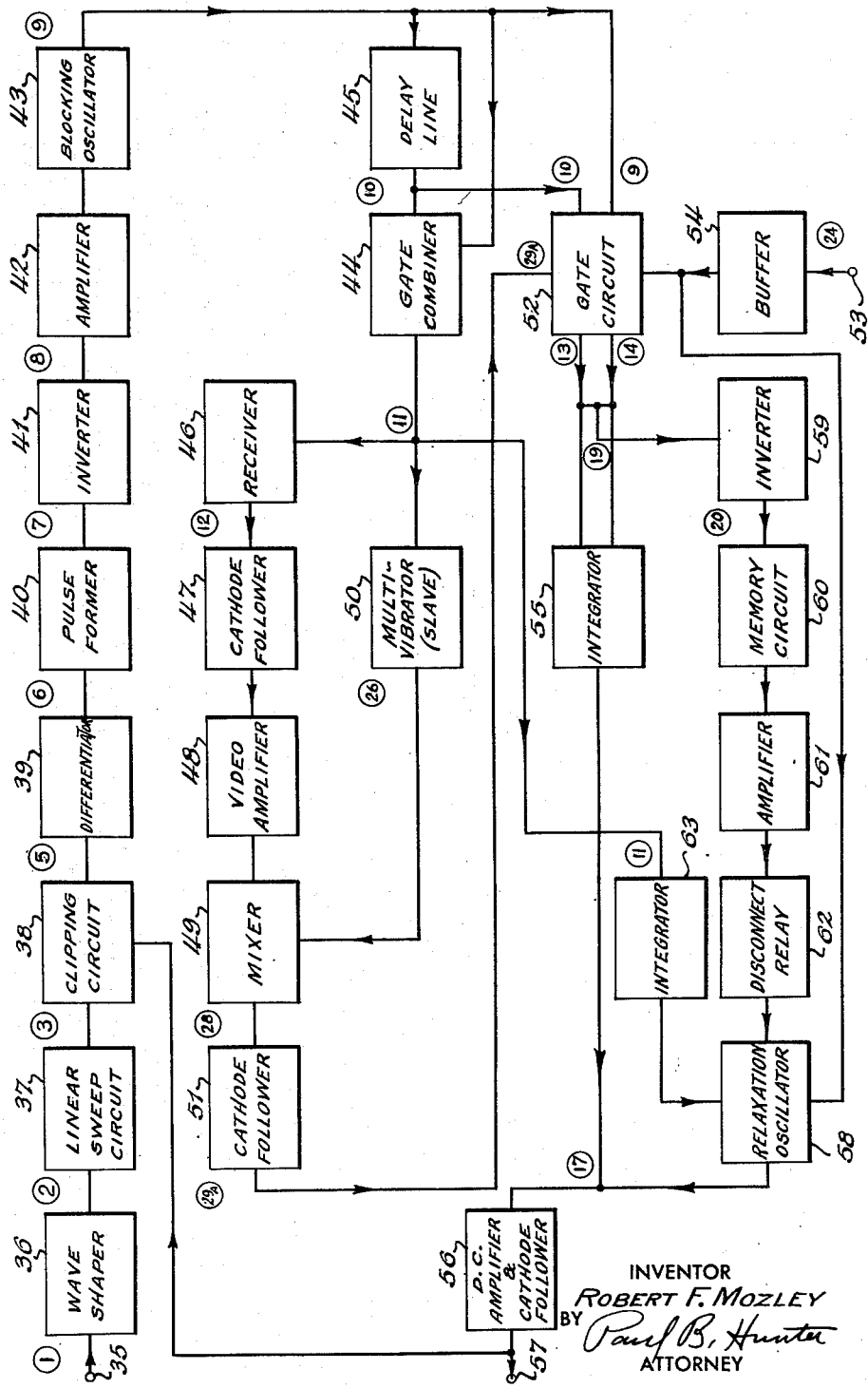

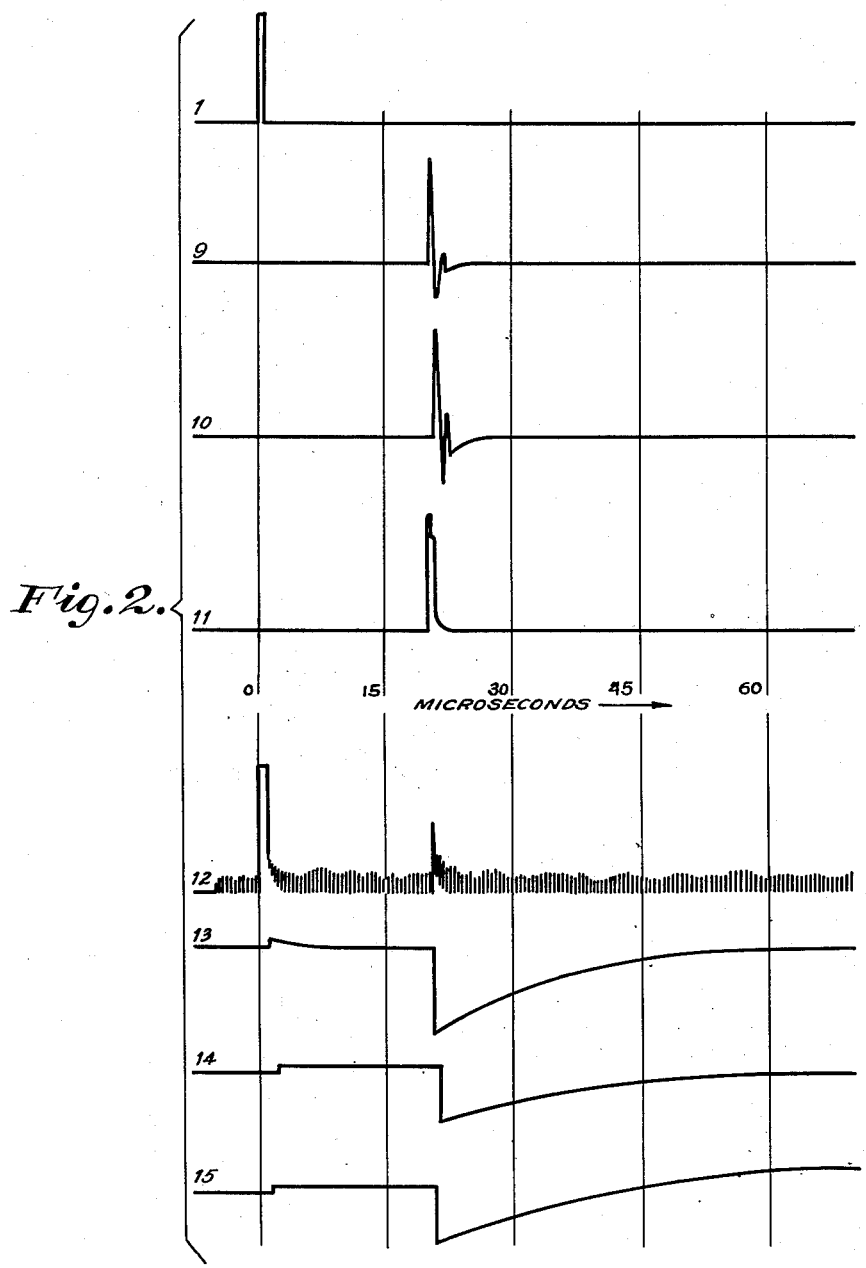

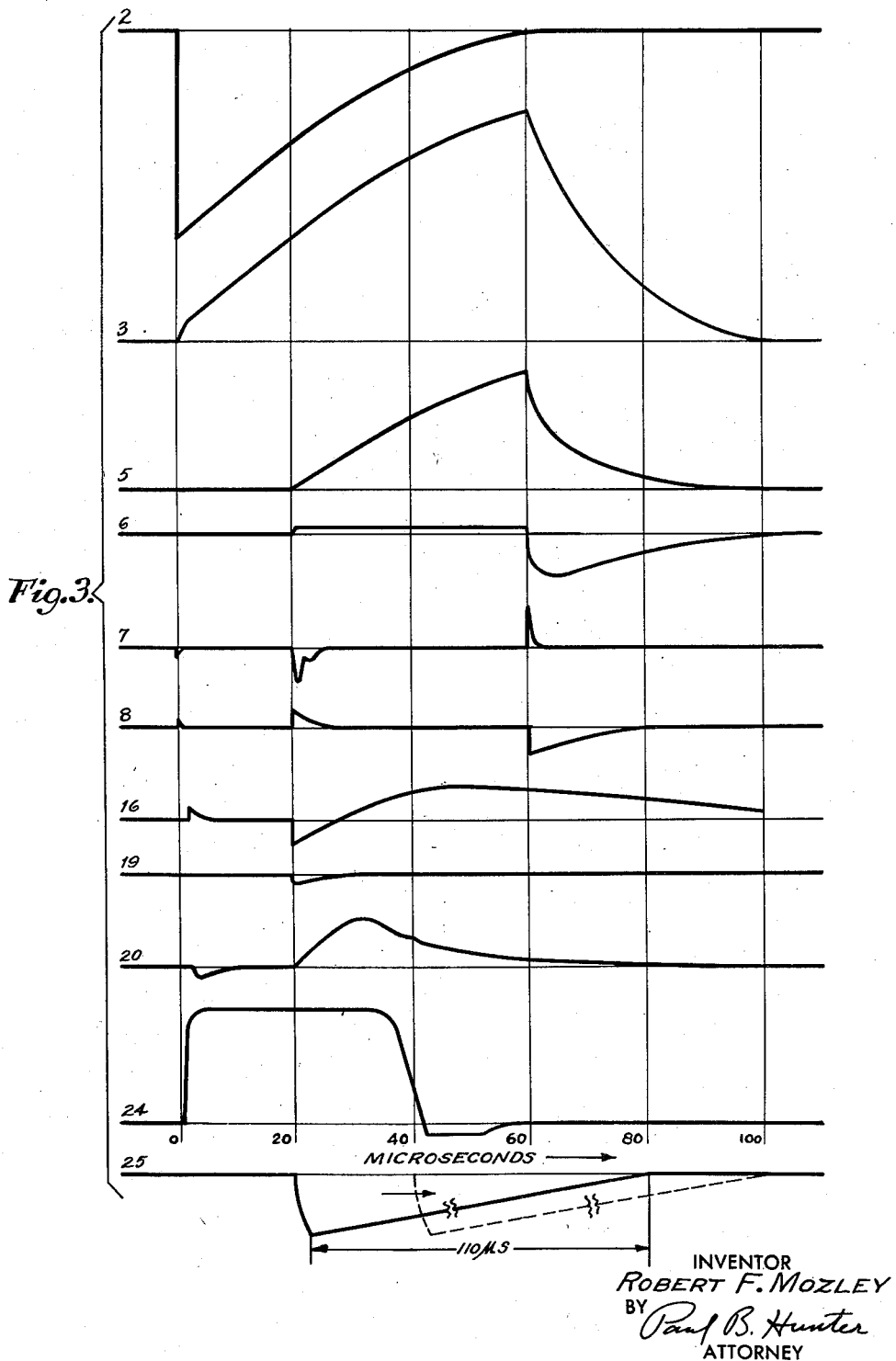

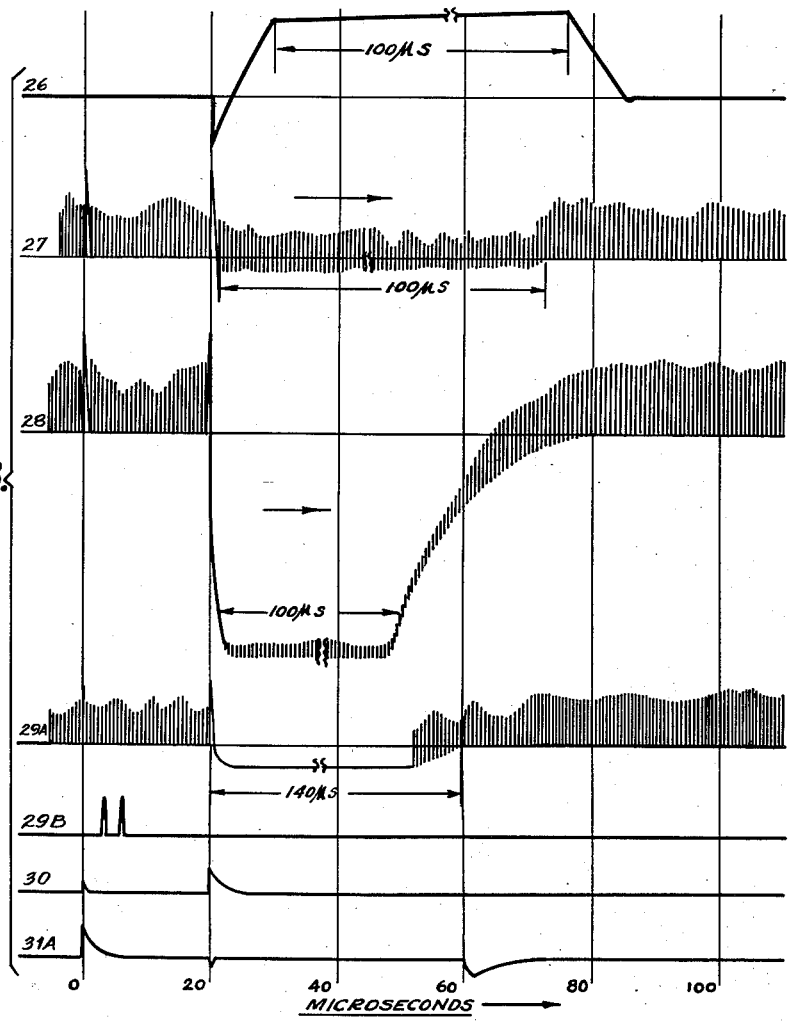
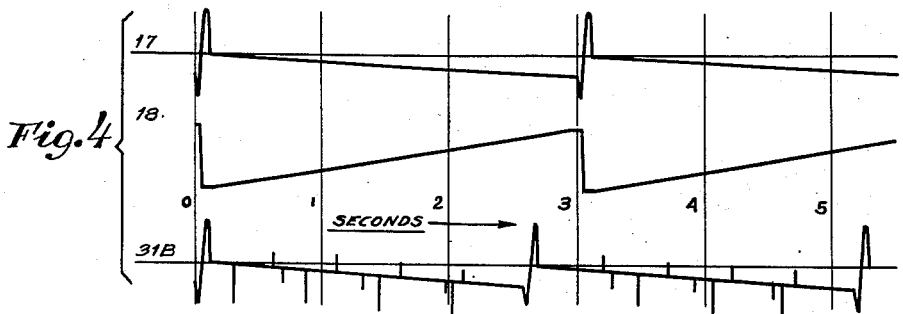

Filed March 29, 1946  5 Sheets-Sheet 5

INVENTOR
ROBERT F. MOZLEY
BY Paul B. Hunter,
ATTORNEY

United States Patent Office 2,786,197
Patented Mar. 19, 1957

2,786,197

RANGING SYSTEM

Robert F. Mozley, Berkeley, Calif., assignor to Sperry Rand Corporation, a corporation of Delaware Application March 29, 1946, Serial No. 658,051

2 Claims. (Cl. 343—7.3)

This invention relates in general to radio detection and ranging or radar systems, and more particularly to improved ranging units for use in such systems.

In a radar system, high-powered bursts of electromagnetic energy are transmitted from a directional antenna into space. When any of this energy strikes an object or target, a small part of it is reflected back to the source and picked up by a suitable receiver. The reflected or "echo" signal provides information as to the direction and range or distance of the object causing the reflection.

In general, a radar system has two principal modes of operation. In the first, called "search," the radar beam automatically searches over a selected area for possible targets which show as bright spots on the face of a cathode-ray indicator tube. The term "search" may refer to range as well as direction; that is, the radar system may be adapted not only to sweep a selected area for a possible target, but also to vary its effective range periodically in an attempt to locate the target.

The second mode of operation of a radar system, called "track," is employed after a target has been located. The radar beam is caused to have a direction which continuously intercepts the target regardless of movement thereof and, in addition, the means for providing range information may also automatically adjust itself as the distance from the radar system to the selected target varies.

The portion of the radar system which provides information as to the range of the target is conveniently referred to as the ranging unit. The present invention is concerned solely with improvements in such ranging units.

Various functions must be performed by the ranging unit. One of these is to distinguish between the desired echo signal and signals from other targets or spurious responses generally referred to as "noise." Means must also be provided to prevent the ranging unit from responding to the high-powered transmitted pulses which tend to appear in the output of the receiver through leakage or other causes, and to targets beyond the desired maximum range.

In previously disclosed radar systems, the ranging unit has employed a narrow gate for the purpose of discriminating between targets and for minimizing the effects of noise, and an electronic servo loop has been provided to maintain the narrow gate over the echo signal at all times. The position of the narrow gate, therefore, may be made to furnish ranging data in the form of a voltage which is directly proportional to the distance between the radar system and the selected target. A wide gate is also generally provided for rendering the ranging unit inoperative during the transmission of the high-powered pulses, and non-responsive to reflected signals from targets beyond a given maximum range.

An object of the present invention is to provide an improved ranging unit for radar systems capable of furnishing extremely accurate ranging data.

Another object of the present invention is to provide a radar system ranging unit which is capable of automatically searching for and locating a single target, and then of automatically tracking the chosen target.

A further object of this invention is the provision of a ranging unit in a radar system which is capable of selecting automatically, from a plurality of targets having different ranges, the nearest target.

An additional object of the present invention is to provide a ranging unit for a radar system in which the average noise over the whole range sweep cycle is utilized to set the level above which the echo signal must rise before the mode of operation changes automatically from search to track.

The invention in another of its aspects relates to novel features of the instrumentalities described herein for achieving the principal objects of the invention and to novel principles employed in those instrumentalities, whether or not these features and principles are used for the above principal objects or in the same field.

A further object of the invention is to provide improved apparatus and instrumentalities embodying novel features and principles, adapted for use in realizing the above objects and also adapted for use in other fields.

The above and other objects and features of the invention will be better understood by reference to the following description taken in connection with the accompanying drawings, in which like components are designated by like reference numerals and in which:

Fig. 1 represents, in block form, a portion of a radar system including an improved ranging unit in accordance with the present invention;

Figs. 2–4 are graphical representations of the wave forms which exist in various portions of the system of Fig. 1;

Figure 7:
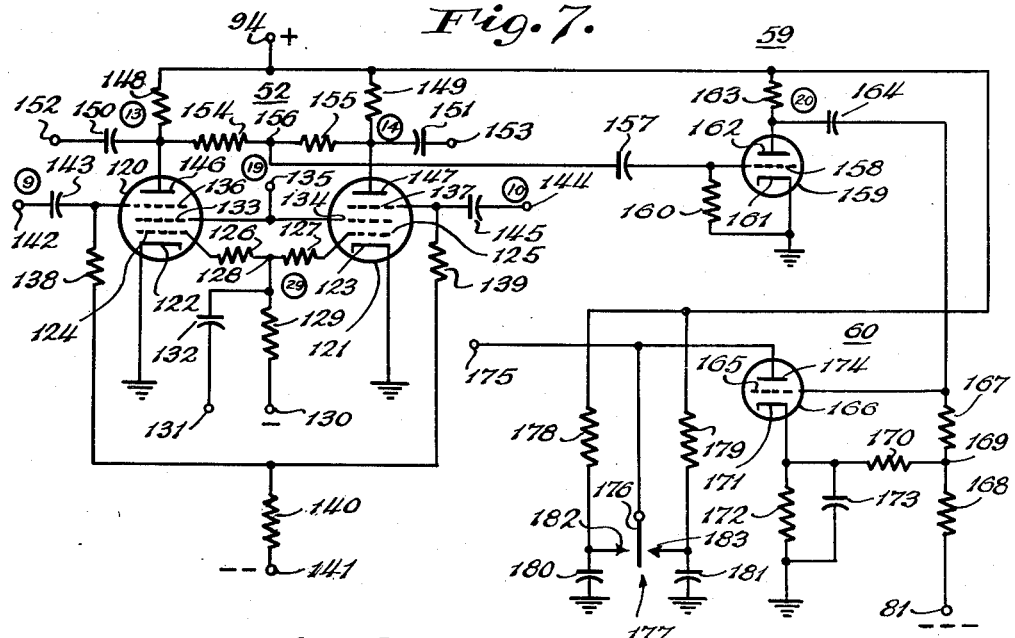
Figure 6:
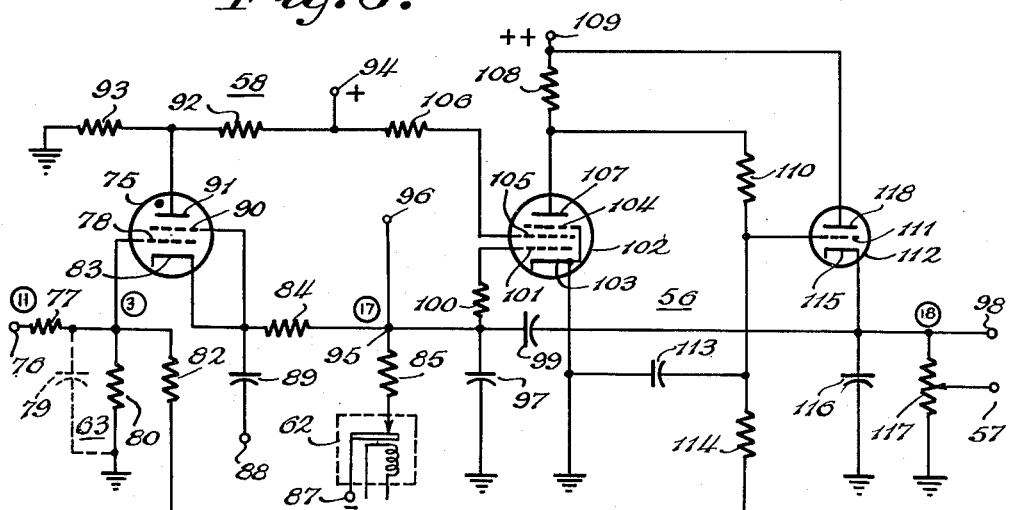

Fig. 6 is a schematic circuit diagram of the portions of the system of Fig. 1 represented by blocks 56, 58 and 63; and Fig. 7 is a schematic circuit diagram of blocks 52, 59 and 60 of Fig. 1.

In the drawings, the encircled reference numerals refer to the corresponding curves or wave shapes of Figs. 2–4. Reference will be made to these curves throughout the following description as an aid to a better understanding of the operation of the present invention.

Referring now to Fig. 1, a positive synchronizing pulse (curve 1) is supplied by the modulator unit (not shown) of the radar system, and is in phase with the high-powered transmitted pulse. This positive synchronizing pulse is supplied, through terminal 35, to a wave shaper 36 the function of which is to convert the positive synchronizing pulse into a negative saw-tooth wave (curve 2).

The output of wave shaper 36 is applied to a linear sweep circuit 37, which develops a saw-tooth wave of the form shown in curve 3. This saw-tooth wave is subjected to clipping, at a level determined in a manner which will be described below, in clipping circuit 38.

The delayed saw-tooth wave (curve 5) constituting the output of circuit 38 is subjected to differentiation in a differentiator 39, to produce a wave of the form shown in curve 6. This wave in turn is converted to a pulse wave (curve 7) by a pulse former 40. After being subjected to inversion in an inverter 41, so that it has the wave form illustrated in curve 8, the wave is amplified by unit 42 and supplied to a blocking oscillator 43 to serve as a trigger therefor.

The output (curve 9) of blocking oscillator 43 may be designated as the "early gate." This early gate is supplied directly to a gate combiner 44, and also indirectly through a delay line 45, the output of which constitutes the "late gate" (curve 10).

The combination of the early and late gates, at the output of unit 44, comprises the narrow gate of the system (curve 11), which is supplied to the receiver 46, in which it may be used to gate the third detectors, for example.

The means thus far described provide three separate gates which are locked together in time relationship and which can be made to vary in time of occurrence with respect to the synchronizing pulse (curve 1) by varying the level of clipping in clipping circuit 38. This may be accomplished automatically in the manner now to be described, so that the narrow gate is maintained in coincidence with the echo signal due to the selected target.

The output signal from receiver 46, commonly called the "video signal" (curve 12) passes through a cathode follower unit 47, which serves as a buffer, and video amplifier 48 into a mixer 49. For the purpose of eliminating the effect of undesired ground targets, a multivibrator 50 of the non-self-oscillating or "slave" type is employed to produce a positive blanking wave (curve 26) which is also supplied to mixer 49. Multivibrator 50 is triggered by the end of the narrow gate (curve 11). The resultant wave (curve 28) is passed through a cathode follower 51, the output (curve 29A) from which is supplied to a gate circuit 52.

The early and late gates (curves 9 and 10) are also applied to gate circuit 52, in which the blanked video signal (curve 29A) is compared with them for time coincidence. In order to prevent the system from being responsive to the high-powered transmitted pulse, a wide gate (curve 24) is also supplied to gate circuit 52 through a terminal 53 and a buffer unit 54. The dual output (curves 13 and 14) of unit 52 is subjected to integration in integrator 55 and is then passed through unit 56, comprising a direct-current amplifier and cathode follower. The resultant is a direct-current voltage which is directly proportional in magnitude to the range of the selected target. This voltage is supplied as bias to clipping circuit 38, and may also be utilized, at a terminal 57, as a ranging voltage.

In operation, if the gates occur slightly early, the late gate will be combined with the video signal in unit 52 to produce a larger output voltage, so that the bias supplied to clipping circuit 38 will be greater and the gates will be delayed somewhat longer, and vice versa. Thus the above-described arrangement constitutes a complete electronic servo loop which is adapted to maintain the narrow gate in coincidence with the echo signal due to the selected target. In other words, means for tracking in range are provided. The means for securing automatic search in range will now be described.

A relaxation oscillator 58 is connected to the junction of units 55 and 56. When this oscillator is operating, the voltage at the junction has the form shown by curve 17. The output of unit 56, then, is as indicated by curve 18. The application of such a saw-tooth voltage as bias on clipper circuit 38 causes the narrow gate to sweep in range, slowly from short to long range, and then rapidly back to short range. Since the searching starts at a predetermined minimum range and continues outwardly, the system will automatically select the nearest target in a given direction. This range searching would continue indefinitely unless means were provided to render oscillator 58 inoperative as soon as the narrow gate coincides with an echo signal.

When such a signal is intercepted, a negative wave (curve 19) appears at the combined output terminal of gate circuit 52 and is subjected to inversion in unit 59, so that it has the form shown by curve 20. This wave is supplied to a "memory circuit" 60, which acts somewhat as a peak voltmeter. The output of unit 60 is amplified by unit 61 and utilized to actuate a disconnect relay 62, which in turn renders relaxation oscillator 58 inoperative. The dual output (curves 13 and 14) of gate circuit 52, henceforth, serves to maintain the narrow gate in coincidence with the intercepted echo signal, as previously described, so that the system is now operating in its tracking mode. If the signal should disappear, circuit 60 will soon cause disconnect relay 62 again to render oscillator 58 operative, thereby automatically returning the system to search operation.

It is desirable that, while searching, the narrow gate should sweep only to the end of the wide gate (curve 24) and then return to the minimum range. To accomplish this, the narrow gate (curve 11) is passed through an integrator 63 and then supplied to oscillator 58. The wide gate is supplied directly from the output of buffer unit 54, and is differentiated within oscillator unit 58. Neither the positive pulse (curve 30) due to the narrow gate nor the negative pulse (curve 31A) formed at the end of the wide gate is sufficient by itself to cause a reversal of the sweep direction. Both waves acting together (curve 31B), however, are capable of reversing the sweep and thus returning it to the minimum range value.

Figure 5:
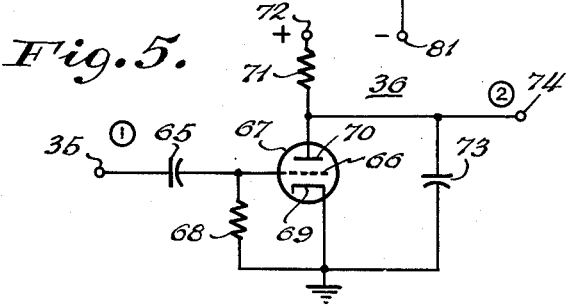
Fig. 5 is a schematic circuit diagram of block 36 of Fig. 1.

Referring now to Fig. 5 of the drawings, there is shown in detail the wave shaper represented by block 36 of Fig. 1. Input terminal 35, to which is applied the synchronizing pulse (curve 1), is coupled by a capacitor 65 to the control electrode or grid 66 of vacuum tube 67. Grid 66 is connected to ground by means of a resistor 68. The cathode 69 of vacuum tube 67 is grounded. The plate or anode 70 of vacuum tube 67 is connected through a load resistor 71 of relatively high value to the positive terminal 72 of a high-voltage source (not shown), the negative terminal of which is grounded. A small capacitor 73 is connected between plate 70 and ground. An output terminal 74 is also connected to plate 70.

In operation, let it be assumed that grid 66 is normally, in the absence of an input signal, sufficiently negative with respect to cathode 69 due to grid-current flow through resistor 68 to maintain vacuum tube 67 substantially at cut-off. Capacitor 73, therefore, is charged to the full potential of terminal 72, since there is no appreciable voltage drop across load resistor 71. When a positive synchronizing pulse (curve 1) is applied to grid 66 through capacitor 65, a relatively large plate current flows and capacitor 73 is very rapidly discharged. Upon removal of the positive pulse on the grid, tube 67 is again cut off. As capacitor 73 is again charged through load resistor 71, plate 70 gradually assumes its original value. The resultant saw-tooth voltage wave at output terminal 74 is represented by curve 2.

Fig. 6 of the drawings shows, in schematic form, the circuit details of the direct-current amplifier and cathode follower unit 56, relaxation oscillator 58, and integrator 63 of Fig. 1. A tetrode thyratron 75 is employed. A terminal 76, to which the narrow gate (curve 11) is applied, is connected through resistor 77 to control-grid 78 of thyratron 75. Control-grid 78 is by-passed to ground by distributed capacitance as indicated by dotted capacitor 79, and is connected to ground through a resistor 80, and to a source of negative potential 81 through resistor 82. Distributed capacitance 79 and resistor 80 comprise integrator 63 (Fig. 1).

Cathode 83 of thyratron 75 is connected through series-connected resistors 84 and 85 and normally closed relay 62 to a source of negative potential 87. Terminal 88, to which is applied the wide gate from buffer unit 54 (Fig. 1), is coupled to cathode 83 by means of a capacitor 89. Shield-grid 90 of thyratron 75 is connected directly to cathode 83. Plate 91 of thyratron 75 is connected to the junction of resistors 92 and 93 in series between a source of positive potential 94 and ground.

The junction 95 of resistors 84 and 85 is connected to a terminal 96 which serves as the input terminal of unit 56 and to which the output of integrator 55 (Fig. 1) is applied. Junction 95 is by-passed to ground by a capacitor 97, and is coupled to an output terminal 98 by a capacitor 99. A resistor 100 is connected between junction 95 and control-grid 101 of a vacuum tube 102.

Cathode 103 of vacuum tube 102 is grounded, as is suppressor-grid 104. Screen-grid 105 is connected through resistor 106 to positive potential source 94. Plate 107 of vacuum tube 102 is connected by resistor 108 to a source 109 of high positive potential. Plate 107 is also directly coupled, by means of a resistor 110, to the control electrode or grid 111 of a vacuum tube 112. Grid 111 is by-passed to ground by a capacitor 113, and is connected through a resistor 114 to negative potential source 81.

Cathode 115 of vacuum tube 112 is connected to output terminal 98, and is by-passed to ground by a capacitor 116. A potentiometer 117, having its movable arm connected to terminal 57, may be connected between output terminal 98 and ground. The plate 118 of vacuum tube 112 is connected to positive potential source 109.

Let it first be assumed that no narrow and wide gates are being applied respectively to terminals 76 and 88, and that relay 62 is closed. Control-grid 78 of thyratron 75 then, due to the voltage-dividing action of resistors 80 and 82, is at a slightly negative potential with respect to ground. Cathode 83, which is connected to negative potential source 87 through resistor 85, becomes increasingly negative relative to ground as capacitor 99, whose effective capacitance is substantially increased in an electronic manner later to be described, gradually becomes negatively charged from source 87 through resistor 85. When the voltage of cathode 83 approaches the potential of control-grid 78, thyratron 75 fires. Cathode 83 is suddenly carried up to the relatively high positive potential of plate 91, so that the thyratron stops conducting and the cycle starts over again. The resultant wave at terminal 96 is shown by curve 17.

If a narrow gate (curve 11) is applied to terminal 76, it is integrated by network 63 comprising distributed capacitance 79 and resistor 80, so that a positive wave (curve 30) is impressed on control-grid 78. The values of resistors 77 and 80 are so chosen, however, that this wave by itself is incapable of causing thyratron 75 to fire. A wide gate from buffer unit 54 (Fig. 1) may be applied to terminal 88, and is differentiated by capacitor 89 and resistor 84 to provide a negative wave (curve 31A) at cathode 83. Once again, this wave is not great enough in magnitude alone to cause the firing of thyratron 75. The combined effect (curve 31B) of the positive wave on the grid and the negative wave on the cathode, however, is such that the thyratron fires. Thus the narrow gate is prevented from sweeping beyond the end of the wide gate, as discussed above in connection with Fig. 1.

The function of relay 62 is to provide definite means for rendering thyratron 75 inoperative whenever desired, and specifically when changing from search to track operation. When relay 62 is energized, its contacts are open and cathode 83 of thyratron 75 is no longer connected to negative potential source 87. The potential of junction 95 under this condition is established by the output of integrator 55 (Fig. 1) which is connected to terminal 96.

Vacuum tubes 102 and 112 function respectively, in the conventional manner, as an amplifier and cathode-follower impedance transformer for the direct-current voltage which is applied to input terminal 96 from integrator 55 during the tracking mode of operation, or which is developed across capacitor 97 during search due to the above-described action of thyratron 75. In addition, vacuum tubes 102 and 112 serve to amplify the effect of capacitor 99, which is effectively in shunt between junction 95 and ground due to the relatively low impedance between output terminal 98 and ground. This additional function of these tubes will now be discussed.

As the voltage at junction 95 decreases slightly, the voltage at output terminal 98 increases by this amount multiplied by the amplification factor due to vacuum tubes 102 and 112. Accordingly, a larger electronic charge must be supplied to capacitor 99 in order to cause a given change of voltage at junction 95, which has the same effect as though capacitor 99 were of much greater capacitance. The gain in effective capacitance approximates the amplification of unit 56. The arrangement described has, as one of its advantages, the fact that a large resistance-capacitance product or time constant may be realized without requiring that resistor 85 be of excessively high resistance with resultant difficulties due to variable leakage paths being developed under conditions of high humidity. Thus the slope of the corresponding portion of the wave (curve 17) is quite small. Capacitor 97, which is effectively in shunt with capacitor 99, serves to filter out undesirable high-frequency components which may be present at junction 95.

As the voltage at junction 95 becomes increasingly negative, the cut-off point of vacuum tube 102 is reached and passed. In this region, therefore, vacuum tube 102 is inoperative and there is no amplification of the effective capacitance of capacitor 99. The slope of the corresponding portion of the wave (curve 17) is accordingly steep.

Resistor 100, which has a relatively high value, is employed in order that control-grid 101 of vacuum tube 102 may remain at a substantially constant level when junction 95 rises to a high positive potential during the firing of thyratron 75. As junction 95 goes positive, grid current flows and causes a voltage drop across resistor 100 which opposes the potential change of junction 95. Thus there is no appreciable change in voltage at output terminal 98 and accordingly no amplification of the effective capacitance of capacitor 99 takes place. In this portion of the cycle, therefore, the resistance-capacitance product or time constant is relatively small, so that the slope of the corresponding portion of the wave (curve 17) is quite steep.

The wave (curve 18) at output terminal 98, then, has much the same shape as a conventional saw-tooth wave except that, for a small region at the beginning and end of each cycle, the wave is flat. An important advantage of the above-described means for producing a saw-tooth wave is that the length of time required for the cycle is almost entirely independent of the characteristics of thyratron 75.

As stated above, one of the important features of the present invention is the provision of means for rendering the automatic switching from search to track substantially independent of noise. How this is accomplished will be explained in connection with Fig. 7 of the drawings, which shows in detail gate circuit 52, inverter 59 and memory circuit 60 of Fig. 1. A pair of pentode vacuum tubes 120 and 121 are employed, as for example type 6AS6 tubes. Cathodes 122 and 123 of tubes 120 and 121 are grounded.

Control-grids 124 and 125 are connected, respectively through resistors 126 and 127, to a junction 128 which in turn is connected through resistor 129 to a source of negative bias potential 130. The blanked video signal (curve 29A) at the output of cathode follower 51 (Fig. 1) is applied to a terminal 131, which is coupled to junction 128 by a capacitor 132. Thus the blanked video signal is simultaneously applied to control-grids 124 and 125.

Screen-grids 133 and 134 of vacuum tubes 120 and 121 are connected together and to a terminal 135, to which is applied the positive wide gate at the output of buffer unit 54 of Fig. 1. Tubes 120 and 121, therefore, are operative only during the presence of the wide gate, and completely cut off otherwise. In this manner, the ranging unit is prevented from locking on the transmitted pulse, which occurs before the leading edge of the wide gate.

Suppressor-grids 136 and 137 of vacuum tubes 120 and 121 are connected, through individual resistors 138 and 139 and common resistor 140, to a source of negative potential 141. A terminal 142, to which the early gate (curve 9) is applied, is coupled by a capacitor 143 to suppressor-grid 136 of vacuum tube 120. Similarly, the late gate (curve 10) is applied to suppressor-grid 137 of vacuum tube 121 through a terminal 144 and a capacitor 145. The characteristics of tubes 120 and 121 are such that each draws no plate current when its suppressor-grid is maintained at a suitable negative potential. When the suppressor-grid is made positive, however, a substantially constant plate current flows regardless of the exact positive potential applied to the suppressor-grid, assuming a given control-grid voltage. Accordingly, vacuum tubes 120 and 121 are rendered operative by the presence, respectively, of the early and late gates, and their operation is substantially independent of the height of these gates.

Plates 146 and 147 of vacuum tubes 120 and 121 are connected to positive potential source 94 by load resistors 148 and 149, respectively. Plates 146 and 147 are coupled, respectively by capacitors 150 and 151, to terminals 152 and 153, which in turn are connected to integrator 55 (Fig. 1). Resistors 154 and 155 are connected in series between plates 146 and 147, and their junction 156 is coupled, by a capacitor 157, to the grid 158 of vacuum tube 159. Grid 158 is grounded through a resistor 160, and cathode 161 is grounded directly.

Plate 162 of vacuum tube 159 is connected by a resistor 163 to positive potential source 94, and is coupled by a capacitor 164 to the grid 165 of a vacuum tube 166. Grid 165 is connected through resistors 167 and 168 in series to negative potential source 81. The junction 169 of resistors 167 and 168 is connected through a resistor 170 to cathode 171 of vacuum tube 166. Cathode 171 is grounded through a resistor 172 shunted by a capacitor 173.

Plate 174 of vacuum tube 166 is connected to an output terminal 175 and to the movable arm 176 of a single-pole double-throw switch 177. Resistors 178 and 179 are connected, respectively, in series with capacitors 180 and 181 between positive potential source 94 and ground, and their respective junctions are connected to contacts 182 and 183 of switch 177.

In operation, vacuum tubes 120 and 121 are so adjusted that no appreciable plate current flows unless control-grids 124 and 125 are positive with respect to cathodes 122 and 123. The control-grids are self-biased by noise, i. e. extraneous voltages due to circuit noise inherent in the system, the noise impulses causing enough grid current to flow through resistor 129 so that the direct-current bias voltage at junction 128 is sufficient to keep the average noise voltage at the control-grids from exceeding the cathode voltage. Thus the noise alone cannot get through tubes 120 and 121 to operate disconnect relay 62 (Figs. 1 and 6), actuated from terminal 175. A signal which is higher than the average noise level, however, will drive the control-grids positive, thus rendering vacuum tubes 120 and 121 conductive and in turn actuating disconnect relay 62.

The purpose of resistors 126 and 127, which are of relatively low resistance compared with resistor 129, is to prevent any one signal from drawing enough grid current to produce an appreciable bias voltage, which would undesirably render the system incapable of causing actuation of the disconnect relay in response to successive smaller signals. Due to the application of ungated video signals to terminal 131, however, enough noise impulses will occur to produce a bias at least equal to the average noise height. Any signal which repeats continuously during the entire cycle will have the same effect as the noise. To prevent the tubes from becoming conductive in the absence of any noise, a suitable negative potential may be applied at terminal 130. The system thus distinguishes between signal and noise in spite of wide variations in the average level of the latter.

When the narrow gate (curve 11), which is being swept in range by the action of relaxation oscillator 58 as described above, passes through a signal (appearing at the output of receiver 46 as shown by curve 12), vacuum tubes 120 and 121 become conductive. Negative waves (curves 13 and 14) occur respectively at plates 146 and 147, and these waves are added together at junction 156 to form the wave of curve 19. The latter wave is inverted by vacuum tube 159, and the resultant wave (curve 20) is applied to grid 165 of vacuum tube 166, which is normally at cut-off.

The application of this positive wave causes vacuum tube 166 to conduct. Switch 177 is assumed to be in its left position, so that arm 176 touches contact 182. Since cathode 171 of vacuum tube 166 is maintained at a substantially negative potential due to the network comprising resistors 168, 170 and 172, the resultant voltage drop across resistor 178 causes capacitor 180 to assume a negative charge and terminal 175 to become negative relative to ground. If the wave (curve 20) is removed from grid 165, vacuum tube 166 no longer conducts, and the charge on capacitor 180 must gradually leak off through resistor 178, which has a relatively high value. Thus the circuit acts as a peak voltmeter, and may be said to have a "memory."

When terminal 175 is negative with respect to ground, unit 61 (Fig. 1) is actuated in such a manner that disconnect relay 62 (Figs. 1 and 6) is energized and caused to open the cathode circuit of thyratron 75, as described above, thus discontinuing the sweep of the narrow gate so that remains locked on the echo signal. Due to the above-mentioned "memory" effect, the system, if the echo signal disappears, will merely drift for a short time before resuming search operation. If it is desired to change quickly from track to search, switch 177 is thrown to the right, thus connecting terminal 175 to positively charged capacitor 181 and causing disconnect relay 62 to close and relaxation oscillator 58 again to operate to sweep the narrow gate in range.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a radar system adapted to radiate into space a pulse of electromagnetic energy and to intercept a portion of said energy reflected from a target, a ranging unit comprising: means for producing a narrow gate pulse having adjustable time relation to said radiated pulse; means for producing a wide gate pulse having fixed time relation to said radiated pulse; searching means for periodically sweeping said time relation of said narrow gate pulse between limits corresponding to the beginning and the end of said wide gate pulse; tracking means jointly responsive to said narrow gate pulse and a reflected energy signal for maintaining said narrow gate pulse substantially in time coincidence with a reflected energy signal; and means responsive substantially solely to a reflected energy signal for simultaneously rendering said searching means inoperative and said tracking means operative.

2. In a radar system including transmitter means for producing recurrent pulses of electromagnetic energy to be radiated into space and including receiver means for receiving portions of the radiated energy reflected from a target, a ranging unit for measuring the range to a target comprising: means adapted to be coupled to said transmitter means for producing recurrent gating pulses having an adjustable time of occurrence relative to said recurrent transmitter pulses, the time of occurrence of said recurrent gating pulses being delayed relative to said transmitter pulses according to the magnitude of an applied voltage, means coupled to said recurrent gating pulse producing means for supplying an alternating voltage thereto for periodically sweeping the time of occurrence of said recurrent gating pulses over a predetermined range of values, means responsive to the coincidence of the reflected energy pulses and said sweeping gating pulses for producing an output signal, means coupling said output signal to said means producing said alternating voltage for arresting the sweeping of said recurrent gating pulses, said means jointly responsive to said reflected energy pulses and said recurrent gating pulses further producing an output control voltage, means coupling said output control voltage to said recurrent gating pulse producing means for maintaining said gating pulses substantially in coincidence with said reflected energy pulses, said output control voltage varying in magnitude according to the range of the target producing said reflected energy pulses, means adapted to be coupled to said transmitter means for producing a wide gating pulse voltage synchronized to said transmitter pulses, means supplying said wide gating pulse voltage to said means producing said alternating voltage, means coupling said recurrent gating pulses from said pulse producing means to said means producing said alternating voltage, said alternating voltage producing means being jointly responsive to said wide gating pulse voltage and said recurrent gating pulses for producing an alternating output voltage only during the coincidence of said recurrent gating pulses and said wide gating pulse voltage.

References Cited in the file of this patent
UNITED STATES PATENTS

| | | |
|---|---|---|
| 2,176,663 | Browne et al. | Oct. 17, 1939 |
| 2,218,067 | Faudell | Oct. 15, 1940 |
| 2,270,405 | Black | Jan. 20, 1942 |
| 2,279,007 | Mortley | Apr. 7, 1942 |
| 2,281,934 | Gieger | May 5, 1942 |
| 2,308,997 | Miller | Jan. 19, 1943 |
| 2,330,109 | Brown | Sept. 21, 1943 |
| 2,341,396 | Smith | Feb. 8, 1944 |
| 2,345,668 | Hallmark | Apr. 4, 1944 |
| 2,398,596 | Price | Apr. 16, 1946 |
| 2,406,316 | Blumlein | Aug. 27, 1946 |
| 2,412,063 | Rosentreter | Dec. 3, 1946 |
| 2,412,064 | Moe | Dec. 3, 1946 |
| 2,416,088 | Deerhake | Feb. 18, 1947 |
| 2,416,320 | Jeanne | Feb. 25, 1947 |
| 2,419,340 | Easton | Apr. 22, 1947 |
| 2,419,546 | Grieg | Apr. 29, 1947 |
| 2,422,074 | Bond | June 10, 1947 |
| 2,431,952 | Maxwell | Dec. 2, 1947 |
| 2,455,265 | Norgaard | Nov. 30, 1948 |
| 2,459,117 | Oliver | Jan. 11, 1949 |
| 2,476,409 | Free | July 19, 1949 |
| 2,516,356 | Tull et al. | July 25, 1950 |
| 2,517,540 | Busignies | Aug. 8, 1950 |
| 2,536,346 | Bradley | Jan. 2, 1951 |
| 2,543,072 | Stearns | Feb. 27, 1951 |
| 2,628,349 | Nightenhelser | Feb. 10, 1953 |